Patented Dec. 17, 1935

2,024,477

UNITED STATES PATENT OFFICE 2,024,477

VULCANIZATION OF RUBBER AND PRODUCTS OBTAINED THEREBY

Winfield Scott, Nitro, W. Va., assignor to The Rubber Service Laboratories Company, Akron, Ohio, a corporation of Ohio No Drawing. Application September 29, 1932, Serial No. 635,403

12 Claims. (Cl. 18—50)

The present invention relates to the manufacture of a vulcanized rubber product by an improved process wherein there is employed, in addition to the ordinary compounding ingredients, a new type of reaction product capable of imparting age resisting or anti-oxidant characteristics to the rubber product.

It is well known to rubber chemists that the use of certain vulcanization accelerators in the curing of rubber is objectionable since the presence of such compounds or of their heat of decomposition or sulfur or other reaction products produced in the rubber curing process apparently cause or aid in causing a relatively rapid deterioration of the vulcanized products. Such rubber products are said to age badly, that is, the rubber becomes hard and loses a large part of its resiliency, while other characteristics such as tensile strength and the like are very detrimentally affected.

The age resisting characteristics of a vulcanized rubber product can be readily ascertained by subjecting samples of the vulcanized product in a bomb to the action of oxygen under pressure, and maintained for several hours at an elevated temperature. The treated samples are then examined and tested and the results compared with similar results obtained by testing the unaged vulcanized stock. The deterioration in properties, suffered as a result of the oxidation treatment is indicative of the result that normally would be expected from that particular stock during service. Such a test is known as the Bierer-Davis aging test and produces an effect on a vulcanized rubber stock comparable with that resulting from several years of natural aging of the rubber.

According to the present invention, a new class of anti-oxidants has been found which, upon incorporation in a rubber stock, imparts the desired age resisting qualities to the vulcanized stock. The compounds imparting such antioxidant characteristics to vulcanized rubber as disclosed in the present specification comprise the sulfur reaction products of diarylamine compounds. The present invention will be fully understood from the following description and examples.

As a method illustrative of the preparation of the preferred class of compounds, substantially one molar portion of di-beta-naphthylamine and approximately two atomic weight portions of sulfur were heated for approximately two to three hours at approximately 190 to 200° C. in the presence of a small portion of a catalyst or condensing agent, for example, a quantity of iodine equal to substantially 0.5 to 2.0% of the combined weight of the sulfur and amine.

The sulfur derivative of p-ethoxy-phenyl-beta-naphthylamine has been prepared and tested as antioxidant. The method of preparation of the sulfurized products was analogous to the preparation of the sulufur reaction product of di-beta-naphthylamine hereinbefore described and comprising the reaction between the corresponding amine and sulfur in the presence of a catalyst or condensing agent, for example iodine.

From an analysis of the resulting product, it is believed the reaction between sulfur and p-ethoxy-phenyl-beta-naphthylamine takes place in the following manner:

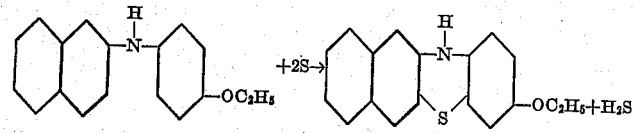

All of the materials hereinbefore cited on incorporating in a standard rubber stock and vulcanizing and then artificially aging in the manner hereinbefore set forth were found to possess desirable antioxidant properties. In no case did the vulcanized rubber stock melt down in the bomb during the aging process.

In all the examples hereinbefore given di-phenyl-guanidine was employed as an accelerator because it is known to produce a vulcanized rubber stock that has poor aging qualities. Other accelerators than diphenyl-guanidine could of course be employed in conjunction with the preferred class of anti-oxidants and in the manner as described.

The invention is to be understood as limited solely by the claims attached hereto as a part of this specification wherein the invention is claimed as broadly as possible in view of the prior art.

The present application is an improvement over my application, Serial No. 362,128 filed May 10, 1929.

What is claimed is:

1. The method of preserving rubber which comprises treating rubber with a sulfur derivative of a diaryl amine, a phenyl radical of said diaryl amine containing a nuclear alkoxy substituent only.

2. The method of preserving rubber which comprises treating rubber with a sulfur derivative of a diaryl amine, a phenyl radical of said diaryl amine containing a nuclear ethoxy substituent only.

3. The method of preserving rubber which comprises treating rubber with a sulfur derivative of p-ethoxy phenyl beta naphthyl amine.

4. A rubber composition comprising rubber and a sulfur derivative of a diaryl amine, a phenyl radical of said diaryl amine containing a nuclear alkoxy substituent only.

5. A rubber composition comprising rubber and a sulfur derivative of a diaryl amine, a phenyl radical of said diaryl amine containing a nuclear ethoxy substituent only.

6. A rubber composition comprising rubber and a sulfur derivative of p-ethoxy phenyl beta naphthyl amine.

7. The method of preserving rubber which comprises treating rubber with a sulfur derivative of a phenyl beta naphthyl amine, one of the nuclear hydrogen atoms of said phenyl group being substituted by an unsubstituted alkoxy group only.

8. A rubber composition comprising rubber and a sulfur derivative of a phenyl beta naphthyl amine, one of the nuclear hydrogen atoms of said phenyl group being substituted by an unsubstituted alkoxy group only.

9. The method of preserving rubber which comprises treating rubber with a sulfur derivative of an amine of the structural formula $$R-\overset{H}{N}-R'$$

wherein R represents a phenyl radical and R' represents an unsubstituted naphthyl radical, said phenyl radical containing an ethoxy substituent only.

10. A rubber composition of matter comprising rubber and a sulfur derivative of an amine of the structural formula $$R-\overset{H}{N}-R'$$

wherein R represents a phenyl radical and R' represents an unsubstituted naphthyl radical, said phenyl radical containing an ethoxy substituent only.

11. The method of preserving rubber which comprises treating rubber with a sulfur derivative of a phenyl beta naphthyl amine, said phenyl radical being substituted by an ethoxy group only.

12. A rubber composition comprising rubber and a sulfur derivative of a phenyl beta naphthyl amine, said phenyl radical being substituted by an ethoxy group only.

WINFIELD SCOTT.